Aug. 4, 1953  H. C. SCHINDLER  2,647,809
CYLINDER AND PISTON CONSTRUCTION
Filed Sept. 30, 1949
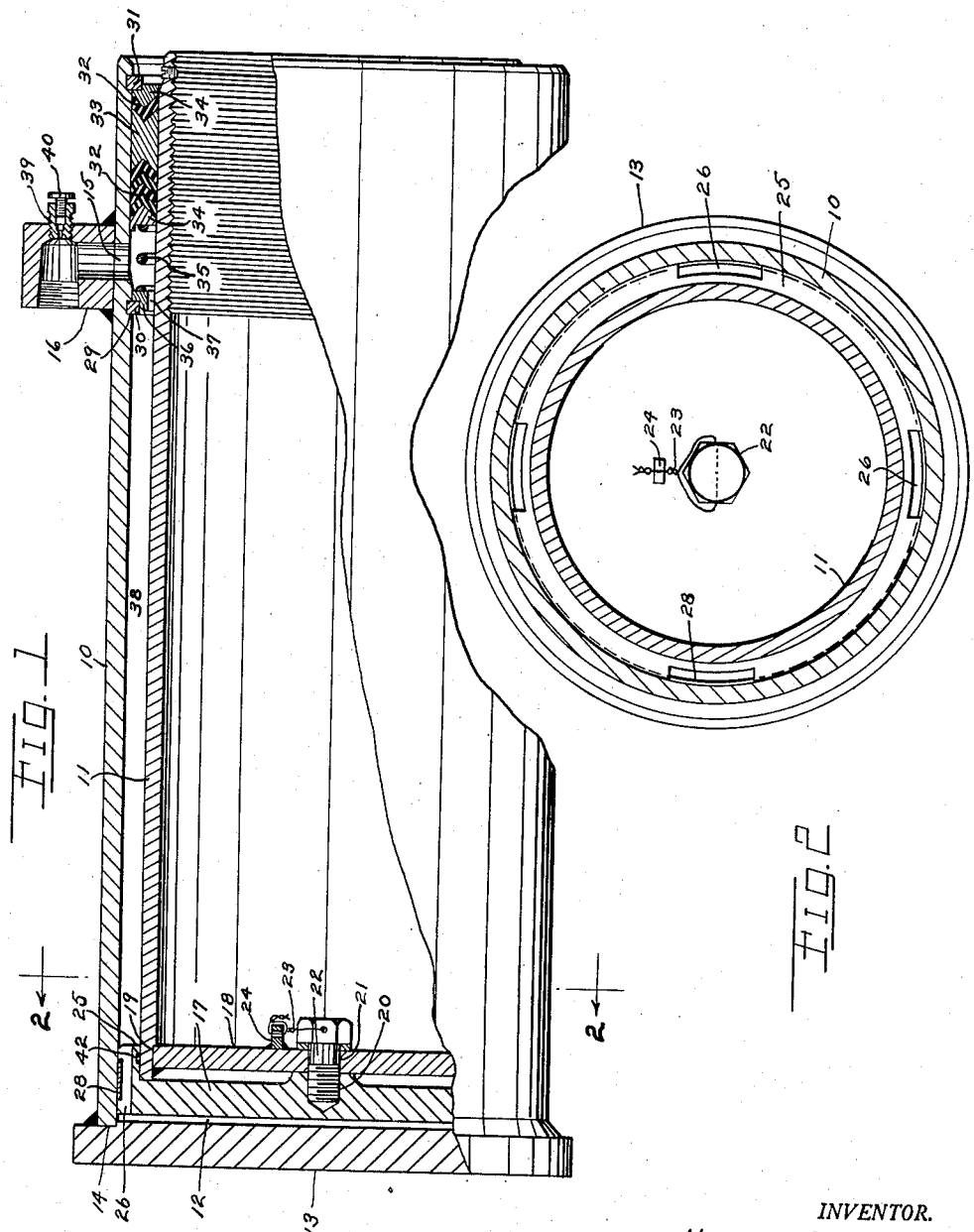
INVENTOR.
HAROLD C. SCHINDLER
BY
Hyde, Meyer, Baldwin & Doran
ATTORNEYS Patented Aug. 4, 1953

2,647,809

UNITED STATES PATENT OFFICE 2,647,809

CYLINDER AND PISTON CONSTRUCTION

Harold C. Schindler, Euclid, Ohio, assignor to The Euclid Road Machinery Co., Cleveland, Ohio, a corporation of Ohio Application September 30, 1949, Serial No. 118,985

5 Claims. (Cl. 309—1)

1

The invention relates to novel and improved hydraulic power applying devices, and is an improvement on the hydraulic hoist illustrated and described in a co-pending application, Serial No. 71,056, filed January 15, 1949 by Raymond Q. Armington and myself. While the present invention is particularly adapted to use in the hydraulic hoist just mentioned, it will be obvious to those skilled in the art that its principles can be advantageously applied in the construction of fluid power apparatus other than the particular one shown in said co-pending application.

In the aforesaid co-pending application there is disclosed and claimed an expansible chamber motor comprising telescopingly movable coaxial elements, the inner ones being adapted to move successively outwardly from a pressure head upon introduction of fluid power to said head, and there being annular packing members between said elements, said packing members being retained in place by snap rings seated in annular grooves in peripheral surfaces of one or other of said elements.

One of the difficulties inherent in assembly or disassembly of the prior construction involves the insertion or removal of the snap rings, since the space between two adjacent telescoping elements is sometimes so restricted that it requires expert manipulation and perhaps special tools to remove the snap rings.

An object of the present invention is to provide an expansible chamber, hydraulic power device having two or more telescoping elements, wherein novel and improved means are provided for ready assembly or disassembly of the device.

Other objects and advantages will be apparent from a study of the following description, in conjunction with the accompanying drawings, in which Fig. 1 is a longitudinal sectional view along the axis of a hydraulic cylinder, parts being broken away and in section, showing one embodiment of my invention; and Fig. 2 is a sectional view taken on the line 2—2 of Fig. 1.

In the drawings I show an expansible chamber motor comprising an outer cylinder 10, and an inner cylinder 11 telescopingly movable in said outer cylinder. The inner cylinder may contain within it still another telescopingly movable element, not here shown, so as to achieve a double extension when desirable or necessary, but the characteristic advantages of my invention can be clearly illustrated and described by means of the two relatively movable cylinders shown. It

2 will be understood that one of said cylinders is normally fixed in position, and that upon introduction of fluid power to the pressure chamber 12 between the inner heads, the other said cylinder becomes a work performing element, being attached to or otherwise effective upon a load. In the present instance it is immaterial which cylinder is fixed, and which is movable, but for the purpose of description the cylinder 10 may be regarded as fixed, while the cylinder 11 is reciprocable to the right and left therein (Fig. 1) responsive to introduction or exhaust of fluid power to or from the pressure chamber 12.

The outer cylinder 10 has an end head 13, which in the present embodiment is an imperforate disk provided with an annular rabbeted groove 14 in which the tubular wall portion 10 is seated, and permanently attached by welding, as shown. The use of a plain tube 10 with a plain disc 13, both connected by welding, constitutes an extremely simple and economic structure. Rough machining operations, such as needed with cast cylinders, are thereby avoided.

The outer cylinder 10 has an inlet port 15 provided with a suitable fitting 16 through which oil or other fluid pressure means can be admitted. The inner cylinder 11 is a length of seamless tubing provided at its rear end with a cap 17. The cap is of substantially discoidal form, and is shaped or nested to receive the inner end of cylinder 11. Said cylinder 11 is actually closed by a disk 18 which is welded in the end thereof, in a rabbeted annular groove 19 in the inner cylindrical periphery. Cap 17 has a threaded bore 20, opening inwardly, at its center, and disk 18 has an axially aligned aperture 21. The shank 22 of a cap screw passes freely through aperture 21 and its threaded tip is removably fixed in the bore 20. A tie member 23 passes through a hole in the cap screw head, and is releasably attached to the lug 24 to prevent undesired rotation of the cap screw. The advantages of this structure will become apparent hereinafter when the assembly of the apparatus is described. When equipped with an end closure such as just described, the inner cylinder 11 becomes a piston, and may be herein so identified.

The cap 17 projects radially outwardly beyond cylinder 11 so as to afford a transverse shoulder flange 25. The shoulder flange is provided with circumferentially spaced slots 26 to permit passage of the hydraulic fluid to pressure head 12, and with a peripheral groove which serves as a seat for a bearing ring 28. The outer periphery of cap 17 has a sliding fit in cylinder 10. The central portion of cap 17 is not necessary to close cylinder 11 (in view of disk 18) but here serves to hold shoulder flange 25 detachably to the cylinder head.

The inner wall surface of cylinder 10 is provided with a circumferential ring groove 29 which serves as a seat for the split snap ring 30. It will be apparent that outward movement of the inner cylinder 11 may proceed until the leading portion of shoulder 25 comes into contact with ring 30. This stop ring may be placed at any desired location along the inner bore of cylinder 10, and its position determines the length of travel of inner cylinder 11.

A second split snap ring 31 is placed in a groove adjacent the open end of cylinder 10. The annular space between rings 30 and 31 is occupied by packing means comprising resilient chevron packing 32, a spacer ring 33, a pair of packing retaining rings 34, spring means 35 for maintaining sealing pressure on the packing 32, and a spring seating ring 36.

When hydraulic fluid is admitted through fitting 16 and port 15 it flows through spaces 37 and 38, and slots 26 into pressure chamber 12 so as to drive the piston comprising cylinder 11 and its end closure 17, 18 to the right (Fig. 1) against such load as is moved by said piston. For return of the piston hydraulic fluid pressure is vented or released at any suitable control point, not shown. The vent plug 39 with its control screw 40 is not for working control, but may be used to vent air, or even oil, when desirable or necessary. The normal pressure fluid for the embodiment shown is usually oil.

As previously indicated, the present invention is an improvement on a hydraulic hoist construction shown in a copending application, Serial No. 71,056, filed January 15, 1949, by Raymond Q. Armington and myself. In the structure disclosed in said co-pending application the end head of the inner cylinder was permanently attached to the cylinder, and since such end head could not be withdrawn past the snap rings (corresponding to rings 30 and 31 in the present application) said rings had to be removed before withdrawal of the cylinder. Insertion of the snap rings, and more particularly removal of the inner snap ring, presented a difficult problem when the space 38 was narrow.

In the present embodiment, assuming the device fully assembled, as shown in Fig. 1, removal of the cylinder 11 is readily effected by inserting the arm (or a tool) into the cylinder 11 from its open right end, removing cap screw 22, and then sliding cylinder 11 to the right, completely out of cylinder 10, but leaving end head 17 in the cylinder 10. If it is desired to remove said end head, the snap rings 30 and 31 and the other elements of the packing assembly can easily be extracted, and the end head then withdrawn. Assembly of the various parts can be accomplished by performing the above described operations in the reverse order.

In the embodiment shown in the drawings the cylinder 11 is shown as being threaded at its open end so as to be adapted, for example, to receive a similarly threaded plug for abutment against, or connection to, an element to be moved or a load to be lifted, etc. It will be apparent that a number of successively smaller coaxial cylinders can be assembled, one within another, for multiple extension, some or all of them having an inner head construction such as herein shown and described.

Since the telescoping cylinders in the illustrated embodiment bear to each other the relationship of a cylinder and a piston, my use of the term inner cylinder should be understood to comprehend also such structures as are or may be sometimes termed pistons. It should be apparent that if the cap 17 is imperforate, and if its attachment to cylinder 11 is rendered leak proof, for instance by packing ring 42, then disk 18, instead of being imperforate, may be a spider having a central hub through which cap screw 22 extends.

What I claim is:

1. A cylinder and piston assembly comprising a tubular cylinder having a closed end and an open end, a piston reciprocable in said cylinder, said piston having on its inner end a head with an annular rigid shoulder flange projecting radially outwardly, means detachably securing said shoulder flange to said head, said cylinder having a pair of spaced ring grooves on its inner surface near its open end, a pair of snap rings respectively seated one in each groove, each ring having a portion thereof projecting inwardly into said cylinder so as to retain annular packing material between said rings, the annular shoulder of said piston head being disposed in said cylinder between the closed end of said cylinder and the innermost snap ring, the outside diameter of said shoulder being greater than the inside diameter of said innermost snap ring, and means accessible through the open end of said cylinder and through the interior of said piston for manipulating said securing means for detaching said annular shoulder flange from said piston or connecting it thereto.

2. A cylinder and piston assembly comprising a cylinder having a closed end and an open end, a piston reciprocable in said cylinder and having a tubular side wall and an imperforate head, said head including a portion permanently fixed to said side wall and a releasable portion connected to said fixed portion, said releasable portion having a rigid bearing part extending radially outwardly beyond the said tubular wall for sliding contact with the inner wall of said cylinder, said cylinder inner wall being provided, near its open end, with a snap ring having a portion thereof extending into said cylinder, and adapted to retain packing, the said bearing part of said piston being normally disposed between said snap ring and the closed end of said cylinder, the outside diameter of said rigid bearing part being greater than the inside diameter of said snap ring, and means accessible through the open end of said cylinder and the interior of said piston for releasing said releasable portion of the piston head from said fixed portion of the piston head.

3. A cylinder and piston assembly comprising a cylinder having a closed end and an open end, a piston reciprocable in said cylinder and having an imperforate head portion whereby to define a pressure chamber between said piston head and the closed end of said cylinder, said piston head comprising a rigid cap portion larger in diameter than the balance of said piston and having a peripheral face adapted to slidingly fit in said cylinder, said cylinder having a ring groove on its inner surface near its open end, a snap ring seated in said ring groove and projecting radially inwardly therefrom furnishing a stop preventing outward movement of said cap portion past said stop, and means fixed with respect to said piston for releasably retaining said cap on said piston, said means being accessible through the open end of said cylinder and through the interior of said piston.

4. A cylinder and piston assembly as defined in claim 3 wherein said piston has a tubular seamless steel skirt, and wherein the means for releasably retaining said cap comprises a disk integrally fixed at the head end of said skirt, said disk having a central aperture therethrough, said cap having a central threaded bore, and threaded bolt means having a shank passing through said aperture and seated in said bore, the head of said bolt being accessible within said piston.

5. In a cylinder and piston assembly having a hollow piston reciprocatable in a hollow cylinder having a closed end, and wherein said piston has an outer cylindrical surface spaced radially from an inner cylindrical surface of said cylinder and with packing means in said radial space, the combination therewith of rigid head means closing the hollow of said piston at its inner end and extending radially outwardly to slidingly engage said inner cylindrical surface, piston retaining means secured to said cylinder spaced from the closed end thereof and extending radially inwardly therefrom into the path of said head means as said piston moves out of said cylinder, and releasable securing means connecting said head means to said piston, said securing means having a part operable for head means release and accessible through the end of said piston opposite said head means.

HAROLD C. SCHINDLER.

References Cited in the file of this patent

UNITED STATES PATENTS

| Number | Name | Date |
|---|---|---|
| 1,424,233 | Berry | Aug. 1, 1922 |
| 1,526,309 | Hof | Feb. 10, 1925 |
| 1,569,589 | Stocker | Jan. 12, 1926 |
| 2,022,224 | Tetlow | Nov. 26, 1935 |
| 2,204,365 | Klemm | June 11, 1940 |
| 2,334,396 | Dorward | Nov. 16, 1943 |
| 2,426,108 | Loewe | Aug. 19, 1947 |

FOREIGN PATENTS

| Number | Country | Date |
|---|---|---|
| 565,387 | Great Britain | Nov. 8, 1944 |